(12) United States Patent
Hofmann et al.

(10) Patent No.: US 9,586,856 B2
(45) Date of Patent: Mar. 7, 2017

(54) HIGH STRENGTH GLASS FIBERS WITH CONTROLLED REFRACTIVE INDEX, COMPOSITION FOR MAKING SUCH FIBERS AND COMPOSITE MATERIALS FORMED THEREFROM

(75) Inventors: Douglas Alan Hofmann, Hebron, OH (US); Peter Bernard McGinnis, Gahanna, OH (US); Rebecca Elaine Cochran, Granville, OH (US)

(73) Assignee: OCV Intellectual Capital, LLC, Toledo, OH (US)

( * ) Notice: Subject to any disclaimer, the term of this patent is extended or adjusted under 35 U.S.C. 154(b) by 23 days.

(21) Appl. No.: 13/515,518

(22) PCT Filed: Dec. 13, 2010

(86) PCT No.: PCT/US2010/060091
§ 371 (c)(1),
(2), (4) Date: Aug. 31, 2012

(87) PCT Pub. No.: WO2011/081883
PCT Pub. Date: Jul. 7, 2011

(65) Prior Publication Data
US 2012/0322933 A1  Dec. 20, 2012

Related U.S. Application Data

(60) Provisional application No. 61/286,035, filed on Dec. 14, 2009.

(51) Int. Cl.
C03C 13/00 (2006.01)
C08J 5/04 (2006.01)
C08K 7/14 (2006.01)

(52) U.S. Cl.
CPC ............... *C03C 13/00* (2013.01); *C08J 5/043* (2013.01); *C08K 7/14* (2013.01); *C08J 2381/06* (2013.01)

(58) Field of Classification Search
CPC ....... C03C 13/00; C08J 5/043; C08J 2381/06; C08L 81/06; C08K 7/14
USPC ....................................... 524/492
See application file for complete search history.

(56) References Cited

U.S. PATENT DOCUMENTS

| | | | |
|---|---|---|---|
| 3,904,423 A * | 9/1975 | Guthrie | 501/38 |
| 4,102,692 A * | 7/1978 | Schartau et al. | 501/38 |
| 4,935,387 A | 6/1990 | Beall | |
| 5,244,975 A * | 9/1993 | Asai et al. | 525/189 |
| 2003/0158371 A1 | 8/2003 | Akamine et al. | |
| 2007/0112123 A1* | 5/2007 | Sekine | 524/494 |
| 2007/0179237 A1 | 8/2007 | Sekine | |
| 2008/0009403 A1 | 1/2008 | Hofmann | |
| 2010/0160528 A1* | 6/2010 | Fujiwara | C03C 3/087 524/492 |

FOREIGN PATENT DOCUMENTS

| | | | | |
|---|---|---|---|---|
| JP | 58-60641 | * | 4/1983 | C03C 3/078 |
| JP | 5-294671 | * | 11/1993 | C03C 13/06 |
| WO | WO/2008/156091 | * | 12/2008 | C03C 3/087 |
| WO | 2011/081883 | | 7/2011 | |

OTHER PUBLICATIONS

Derwent Abstract of JP 5-294671, pp. 1-2.*
Harris, "Quantitative Chemical Analysis, 3rd Edition", W. H. Freeman and Company, New York, p. 549 (1991).*
Richard J. Lewis, Sr. "Hawley's Condensed Chemical Dictionary, 12th Edition", John Wiley & Sons, Inc., New York p. 997 (1993).*
Refractive Index Database—polycarbonate, p. 1, obtained online from http://refractiveindex.info/?group=PLASTICS&material=PC.*
Derwent Abstract of JP 58-60641, pp. 1-2.*
Lane et al, Abstract of Polysulfone Corneal Lenses, p. 1 obtained online from http://www.ncbi.nlm.nih.gov/pubmed/3083093.*
International Search Report and Written Opinion from PCT/US10/060091 dated Aug. 11, 2011.

* cited by examiner

*Primary Examiner* — Alexander Kollias
(74) *Attorney, Agent, or Firm* — Calfee, Halter & Griswold LLP

(57) ABSTRACT

Glass fibers are presented having a composition of about 48-54 weight percent $SiO_2$; about 7-14 weight percent $Al_2O_3$, about 10-16 weight percent CaO, about 7-13 weight percent $TiO_2$, and about 9-19 weight percent ZnO. A composite material is also provided formed of a polymer matrix and glass fibers of the present invention. The fibers of the present invention have a refractive index between about 1.60 and 1.66 at 590 nm.

15 Claims, No Drawings

HIGH STRENGTH GLASS FIBERS WITH CONTROLLED REFRACTIVE INDEX, COMPOSITION FOR MAKING SUCH FIBERS AND COMPOSITE MATERIALS FORMED THEREFROM

CROSS REFERENCE TO RELATED APPLICATION

This application is the U.S. national phase entry of PCT/US10/060091 with an international filing date of Dec. 13, 2010 which claims priority to U.S. Provisional Application Ser. No. 61/286,035, filed Dec. 14, 2009, both of which are incorporated by reference in their entirety.

BACKGROUND

A number of glass compositions are known for reinforcing composite materials. Typically, glass composition are tailored for making continuous high-strength glass fiber strands with importance placed upon placed upon strength, ease of manufacturing, control of raw materials costs, chemical compatibility and environmental concerns. S-Glass, R-Glass and E-Glass are well known compositions for reinforcing polymer matrix materials to form composite structures. S-Glass is formed primarily of the oxides of magnesium, aluminum, and silicon with a chemical composition that produces glass fibers having a higher mechanical strength than E-Glass fibers. The S-glass composition produces high strength glass fiber for use in high strength applications such as ballistic armor.

R-Glass is another family of high strength, high modulus glasses that is typically formed into fibers for use in aerospace composite applications. The R-Glass family is primarily composed of silicon oxide, aluminum oxide, magnesium oxide, and calcium oxide with a chemical composition that produces glass fibers with mechanical strength which is generally lower than S-Glass fibers. R-Glass generally contains less silica and greater calcium oxide (CaO) than S-Glass which requires higher melting and processing temperatures during fiber forming.

Glass fibers are often used to reinforce polymer matrices. Some polymers are used to form articles that are transparent. It is desirable to have glass fibers that can reinforce such transparent polymers without significantly degrading the transparency or other appearances of the polymers.

SUMMARY

In accordance with embodiments of the present invention, a reinforcing glass fiber, of about 48-54 weight percent $SiO_2$; about 7-14 weight percent $Al_2O_3$; about 10-16 weight percent CaO; about 7-13 weight percent $TiO_2$; about 9-19 weight percent ZnO, and about 0-2 weight percent $LiO_2$.

In accordance with additional embodiments of the present invention, composite materials formed of a polymer matrix and glass reinforcing fibers are provided. The fibers may have a refractive index between about 1.60 and 1.66 at 590 nm.

These and other embodiments of the present invention will be discussed more completely herein.

DETAILED DESCRIPTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

In accordance with embodiments of the present invention, glass batch compositions for the formation of continuous glass fibers that are particularly useful in the manufacture of for the reinforcement of polymer materials are provided. The glass fibers of the present invention have a refractive index similar to that of certain polymer materials so that the transparency of a of the polymer matrix can be maintained in a final composite structure. The glass fibers generally have a high strength to weight ratio, good corrosion resistance, increased flexural stability and low overall lifetime costs.

In accordance with embodiments of the present invention, a glass batch composition for the production of glass fibers includes about 48-54 weight percent $SiO_2$, about 7-14 weight percent $Al_2O_3$, about 10-16 weight percent CaO, about 7-13 weight percent $TiO_2$, about 9-19 weight percent ZnO and about 0-2 weight percent $Li_2O$. In one example, the glass composition includes about 48-51.75 weight percent $SiO_2$. In other examples, the glass composition includes about 48-51.75 weight percent $SiO_2$; about 10-13 weight percent $Al_2O_3$; about 13.75-16 weight percent CaO; about 7-11 weight percent $TiO_2$; about 11-13 weight percent ZnO and about 0-2 weight percent $Li_2O$.

In yet other examples, the composition does not contain more than about 2.0 weight % of oxides or compounds selected from the group consisting of $P_2O_5$, $ZrO_2$, SrO, BaO, $SO_3$, $F_2$, $B_2O_3$, and $Fe_2O_3$ either as intentional additions or as tramp materials included in the raw materials. It will be understood by those having skill in the art that glass fibers formed from glass batch compositions will generally have the same composition as the glass batch, as discussed more completely herein.

Starting batch components typically include $SiO_2$ (ground silica sand), and $Al_2O_3$ (calcined alumina) or pyrophyllite, as well as chain modifiers from source materials such as talc, magnesite or dolomite. The carbon included in materials such as magnesite is off gassed as oxides of carbon such as $CO_2$.

Glass batch compositions of the present invention include the fiberizing temperature, the liquidus, and delta-T ($\Delta T$). The fiberizing temperature is defined as the temperature that corresponds to a viscosity of 1000 Poise. As discussed in more detail below, a lowered fiberizing temperature reduces the production cost of the fibers, allows for a longer bushing life, increases throughput and reduces energy consumption. As a result, production cost is reduced.

The liquidus of a glass is defined as the highest temperature at which equilibrium exists between liquid glass and its primary crystalline phase. At all temperatures above the liquidus, the glass is free from crystals in its primary phase. At temperatures below the liquidus, crystals may form. Crystals in the melt will cause blockages in the bushing and weakness in the fibers.

Delta-T ($\Delta T$), which is defined as the difference between the fiberizing temperature and the liquidus. A larger $\Delta T$ offers a greater degree of flexibility during the formation of the glass fibers and helps to inhibit devitrification of the glass (that is, the formation of crystals within the melt) during melting and fiberizing. Increasing the $\Delta T$ also reduces the production cost of the glass fibers by allowing for a greater bushing life and by providing a wider process window for forming fibers.

In some embodiments, the glass composition may have a fiberizing temperature of less than about 2650° F., or, in one embodiment, less than about 2625° F., or in another embodiment less than about 2600° F., and in yet another embodiment less than about 2575° F. In some embodiments, the glass composition may have a liquidus temperature, in one embodiment below the fiberizing temperature by at least about 25° F., in another embodiment, below the fiberizing temperature by at least about 50° F., and, in yet another embodiment, below the fiberizing temperature by at least about 75° F.

In some embodiments, the fiber has a modulus greater than 12.8 MPsi and a pristine tensile strength greater than about 700 KPsi. In yet another embodiment, the fiber has a modulus greater than about 13 MPsi and a pristine tensile strength greater than 750 KPsi.

The glass fibers of the present invention are optimized to correspond to the optical properties of a certain polymer matrix materials and result in a composite material having improved optical and mechanical properties when used in conjunction with the matrix materials. By matching or approximating the refractive index of the polymer matrix material, the resulting composite material may provide improved optical properties. In order to improve transparency the fibers will approximate the refractive index of the matrix across a wide spectrum of visible light. The variation of refractive index with wavelength (the dispersion) in a material is quantified as the Abbe Number. In some embodiments, the fiber may have a refractive index of between about 1.60 and 1.66 at 590 nm. In other embodiments, the fiber may have a refractive index of between about 1.61 and 1.64 at 656 nm. In yet other embodiments, the fiber may have a refractive index of between about 1.62 and 1.66 at 486 nm. In some embodiments, the fiber may have a refractive index of any combination of between about 1.60 and 1.66 at 590 nm, between about 1.61 and 1.64 at 656 nm, and between about 1.62 and 1.66 at 486 nm. In some embodiments, the dispersion, measured by Abbe Number, of the fibers may be between 42.6 and 47.6.

Any suitable polymer matrix material may be used in conjunction with the glass fibers to form composite materials. In some embodiments, the polymer matrix material may have a refractive index of between about 1.60 and 1.66 at 590 nm. In some embodiments, the polymer matrix material may comprise polysulfone. Polysulfone is a rigid, high-strength, and transparent polymer material, which retains its properties mechanical properties across a wide temperature spectrum. Polysulfone has very high dimensional stability and a glass transition temperature of about 185° C. and a refractive index of 1.63 at 590 nm. Polysulfone has good resistant to alkali, mineral acids, and electrolytes in pH of about 2 to 13 and is resistant to oxidizing agents. Polysulfone is useful in a number of industries due to its mechanical and chemical properties. Polysulfone is produced by the reaction of a diphenol and bis(4-chlorophenyl)sulfone, forming a polyether by elimination of sodium chloride by the formula:

$$n\text{HOC}_6\text{H}_4\text{OH}+n(\text{ClC}_6\text{H}_4)_2\text{SO}_2+n\text{Na}_2\text{CO}_3 \rightarrow \\ [\text{OC}_6\text{H}_4\text{OC}_6\text{H}_4\text{SO}_2\text{C}_6\text{H}_4]_n+2n\text{NaCl}+n\text{H}_2\text{O}+ \\ n\text{CO}_2$$

Table I shows the refractive index of polysulfone (PSU) at 656 nm (nC), 590 nm (nD) and 486 nm (nF) as well as the dispersion and the Abbe number of the materials.

TABLE I

|     | Refractive Index | | | | Abbe Number |
| --- | --- | --- | --- | --- | --- |
|     | nC (656 nm) | nD (590 nm) | nF (486 nm) | Dispersion (nF − nC) | (nD − 1)/ (nF − nC) |
| PSU | 1.6253 | 1.634 | 1.6526 | 0.0273 | 23.2 |

In other embodiments, the matrix material may be polyether sulfone (PES). PES may have a refractive index of about 1.652 at 590 nm. In yet other embodiments, the matrix material may be polyether imide (PEI). PEI may have a refractive index of about 1.657 at 590 nm.

The glass fibers of the present invention may be formed using suitable processes. In some embodiments, the glass fibers of the present invention may be formed using a suitable direct melt process. For example, the glass batch of the present invention is may be melted using the glass melting based on an air or oxy/gas-fuel combustion. Often, such glass melting furnaces also include one more bubblers and/or electrical boost electrodes. One suitable direct melt furnace is illustrated in Fig. 1, in which the glass melting furnace 10, includes an elongated channel having an upstream end wall 14, a downstream end wall 16, side walls (not shown), a floor 20, and a roof 22. Each of the components of the glass melting furnace 10 are made from appropriate refractory materials such as alumina, chromic oxide, silica, alumina-silica, zircon, zirconia-alumina-silica, or similar oxide-based refractory materials. The roof 22 generally has an arcuate shape transverse to the longitudinal axis of the composition the channel; however, the roof may have any suitable design. The roof 22 is typically positioned between about 3-10 feet above the surface of the glass batch composition 30. The glass batch material 30 is a mixture of raw materials used in the manufacture of glass in the accordance with the present invention. The glass melting furnace 10 may optionally include one more bubblers 24 and/or electrical boost electrodes (not shown). The bubblers 24 and/or electrical boost electrodes increase the temperature of the bulk glass and increase the molten glass circulation under the batch cover.

In addition, the glass melting furnace 10 may include two successive zones, an upstream melting zone 26 and a downstream refining zone 28. In the melting zone 26, the glass batch composition 30 may be charged into the furnace using a charging device 32 of a type well-known in the art.

In one suitable melter configuration, the glass batch material 30 forms a batch layer of solid particles on the surface of the molten glass in the melting zone 26 of the glass melting furnace 10. The floating solid batch particles of the glass batch composition 30 are at least partially melted by at least one burner 34 having a controlled flame shape and length mounted within the roof 22 of the glass melting furnace 10. A delivery channel 40 is positioned at the outflow of melter 10 to deliver the molten glass batch composition 30 from the melter 10 to the forehearth 310.

Other suitable melters may be used without departing from the present invention. For example, suitable melters include conventional air-gas melters, oxygen-gas melters, electrically fired melters, or any fossil fuel fired melter. It is possible to add electric boost or bubblers to any of the melting processes. It is also possible to include a separate refining zone (as shown in FIG. 1) or incorporate the refining zone into the main tank of the melter.

Once the glass is melted in the furnace, it is delivered to a bushing assembly through which fibers are formed. It will be understood that any suitable bushing assembly may be used. One suitable bushing assembly is shown in Fig. 2. As shown in FIG. 2, a bushing assembly 100 includes a bushing 110 and a bushing frame 210. The bushing 110 includes a bushing main body 120 with sidewalls 122c, 122d and a tip plate 124 extending between the sidewalls 122. The bushing main body 120 is positioned below a bushing block 300 that, in turn, is positioned beneath a forehearth 310.

Fibers are formed when a stream of molten glass is received by the main body 120 from the forehearth 310. The forehearth 310 receives the molten glass from a melter 10 (shown in FIG. 1). The forehearth 310 and bushing block 300 may be conventional in construction and may be formed from refractory materials. The tip plate 124 contains a plurality of nozzles 124a (also referred to herein as orifices) through which a plurality of streams of molten glass may be discharged. The streams of molten material may be mechanically drawn from the tip plate 124 to form continuous filaments 125. The filaments 125 may be gathered into a single continuous strand 125a after having received a protective coating of a sizing composition from a sizing applicator 410. The continuous filaments 125 may also be processed into other desired composite glass materials including, without limitation, wet used chopped strand fibers, dry use chopped strand fibers, continuous filament mats, chopped strand mats, wet formed mats or air laid mats. The fiber formed according to the present invention may include impurities due to interaction of the molten glass with the refractory materials of the melter and forehearth as well as low levels of impurities included in the raw materials added to the batch. Typically, the batch and fibers are referred to as substantially free of these impurities since they are typically present in amounts that are too small to impact the melting, fiberizing or mechanical properties of the batch, glass and fibers.

In processing and composite production, the continuous filaments 125 may also be processed into wet used chopped strand fibers, dry use chopped strand fibers, continuous filament mats, chopped strand mats, wet formed mats or air laid mats. The processed fibers are combined with a polysulfone matrix material and formed into a composite structure in any suitable manner and in any suitable amounts. The resulting composite structure provides the desirable optical properties of the polysulfone matrix while having substantially improved physical properties versus a polysulfone matrix that does not contain the glass fibers.

Having generally described this invention, a further understanding can be obtained by reference to certain specific examples illustrated below which are provided for purposes of illustration only and are not intended to be all inclusive or limiting.

EXAMPLES

The present invention will be better understood by reference to the following examples which are offered by way of illustration not limitation.

Example 1

The glasses in the examples listed in Table IIIA, IIIB and IIIC were melted in platinum crucibles or in a continuous platinum-lined melter for determining the optical and physical properties reported in Tables IIIB and IIIC.

TABLE IIIA

| Glass  | $SiO_2$ | $Al_2O_3$ | CaO   | $TiO_2$ | ZnO   | $Li_2O$ |
|--------|---------|-----------|-------|---------|-------|---------|
| Ex. 1  | 51.00   | 10.00     | 13.00 | 10.00   | 16.00 | 0       |
| Ex. 2  | 50.25   | 13.00     | 12.25 | 9.25    | 15.25 | 0       |
| Ex. 3  | 50.25   | 9.25      | 16.00 | 9.25    | 15.25 | 0       |
| Ex. 4  | 50.25   | 9.25      | 12.25 | 9.25    | 19.00 | 0       |
| Ex. 5  | 48.00   | 10.75     | 13.75 | 10.75   | 16.75 | 0       |
| Ex. 6  | 51.75   | 10.75     | 10.00 | 10.75   | 16.75 | 0       |
| Ex. 7  | 51.75   | 10.75     | 13.75 | 7.00    | 16.75 | 0       |
| Ex. 8  | 51.75   | 10.75     | 13.75 | 10.75   | 13.00 | 0       |
| Ex. 9  | 49.75   | 12.75     | 15.75 | 10.75   | 11    | 0       |
| Ex. 10 | 49.75   | 12.75     | 13.75 | 10.75   | 11    | 2       |
| Ex. 11 | 49.75   | 12.75     | 15.75 | 10.75   | 9     | 2       |
| Ex. 12 | 49.75   | 13.75     | 12.75 | 11.75   | 10    | 2       |

The units of measurement for the physical properties are: Viscosity, Liquidus temperature and ΔT. The fiberizing temperature was measured using a rotating spindle viscometer. The fiberizing viscosity is defined as 1000 Poise. The liquidus was measured by placing a platinum container filled with glass in a thermal gradient furnace for 16 hours. The greatest temperature at which crystals were present was considered the liquidus temperature. The Viscosity, Liquidus temperature ΔT and primary phase are shown in TABLE IIIB

TABLE III-B

| Glass | Viscosity (C.) | Viscosity (F.) | Liquidus (C.) | Liquidus (F.) | Delta T (C.) | Delta T (F.) | Phase     |
|-------|----------------|----------------|---------------|---------------|--------------|--------------|-----------|
| Ex. 1 | 1154           | 2110           | 1231          | 2248          | −77          | −138         | Tridymite |
| Ex. 2 | 1177           | 2151           | 1201          | 2194          | −24          | −43          | Rutile    |
| Ex. 3 | 1133           | 2072           | 1200          | 2192          | −67          | −120         | Tridymite |
| Ex. 4 | 1151           | 2104           | 1280          | 2336          | −129         | −232         | Tridymite |

TABLE III-B-continued

| Glass | Viscosity (C.) | Viscosity (F.) | Liquidus (C.) | Liquidus (F.) | Delta T (C.) | Delta T (F.) | Phase |
|---|---|---|---|---|---|---|---|
| Ex. 5 | 1125 | 2057 | 1180 | 2156 | −55 | −99 | Rutile |
| Ex. 6 | 1188 | 2170 | 1282 | 2340 | −94 | −170 | Tridymite |
| Ex. 7 | 1172 | 2141 | 1209 | 2208 | −37 | −67 | Tridymite |
| Ex. 8 | 1169 | 2136 | 1214 | 2217 | −45 | −81 | Tridymite |
| Ex. 9 | 1162 | 2124 | 1148 | 2099 | 14 | 25 | Zn-bearing Anorthite |
| Ex. 10 | 1112 | 2034 | 1127 | 2060 | −15 | −26 | Sphene |
| Ex. 11 | 1087 | 1988 | 1190 | 2174 | −103 | −186 | Sphene |
| Ex. 12 | 1188 | 2171 | 1172 | 2141 | 16 | 30 | Rutile |

The variation of refractive index with wavelength (the dispersion) in a material is quantified as the Abbe Number. The refractive index measurements for 590 nm (nD) and calculations for 486 nm (nF), 656 nm (nC), Dispersion Number (nF−nC) and Abbe Number ((nD−1)/(nF−nC)) were made using an Abbe refractometer (prism held at 25° C.) are shown in Table IIIC,

TABLE III-C

| Glass | nC (656 nm) | nD (590 nm) | nF (486 nm) | Dispersion (nF − nC) | Abbe Number (nD − 1)/ (nF − nC) | Density (g/cc) |
|---|---|---|---|---|---|---|
| Ex. 1 | 1.6284 | 1.633 | 1.6428 | 0.0144 | 43.96 | 2.935 |
| Ex. 2 | 1.6223 | 1.627 | 1.6369 | 0.0146 | 42.95 | 2.913 |
| Ex. 3 | 1.633 | 1.6377 | 1.6477 | 0.0147 | 43.38 | 2.960 |
| Ex. 4 | 1.6303 | 1.6351 | 1.6452 | 0.0149 | 42.62 | 2.986 |
| Ex. 5 | 1.6432 | 1.6481 | 1.6584 | 0.0152 | 42.64 | 2.992 |
| Ex. 6 | 1.6226 | 1.6277 | 1.6385 | 0.0159 | 39.48 | 2.911 |
| Ex. 7 | 1.6149 | 1.6191 | 1.6279 | 0.013 | 47.62 | 2.931 |
| Ex. 8 | 1.6265 | 1.6314 | 1.6417 | 0.0152 | 41.54 | 2.890 |
| Ex. 9 | 1.6316 | 1.6361 | 1.6457 | 0.0141 | 45.11 | 2.891 |
| Ex. 10 | 1.6319 | 1.6367 | 1.6468 | 0.0149 | 42.73 | 2.875 |
| Ex. 11 | 1.6331 | 1.6378 | 1.6478 | 0.0147 | 43.39 | 2.862 |
| Ex. 12 | 1.6322 | 1.6369 | 1.6469 | 0.0147 | 43.33 | 2.849 |

Example 2

The physical properties of the fibers in a polysulfone (PSU) matrix were measured to determine Stress at Maximum Load, Young's Modulus, and Percent strain at Maximum Load. Ten samples of each of 100% PSU, 90 wt. % Owens Corning Advantex fibers, and 90 wt. % fibers formed from Ex. 9 were formed. The formed samples were conditioned at 23° C. and 50% relative humidity for a period of 24 hours. The tensile properties were measured in accordance with ASTM D638 with a crosshead speed of 0.2 inches per minute and an extensometer gage length of 2.0 inches. The physical properties are shown in Table IV, below.

TABLE IV

| | Stress at Max Load (PSI × 10³) | Young's Modulus (PSI × 10⁶) | % Strain at Max Load (%) |
|---|---|---|---|
| 100% PSU | 9.34 | 0.34 | 5.71 |
| 90% Advantex | 12.41 | 0.63 | 3.64 |
| 90% Ex. 9 | 11.90 | 0.607 | 3.67 |

As is understood in the art, the above exemplary inventive compositions do not always total 100% of the listed components due to statistical conventions (such as, rounding and averaging) and the fact that some compositions may include impurities that are not listed. Of course, the actual amounts of all components, including any impurities, in a composition always total 100%. Furthermore, it should be understood that where small quantities of components are specified in the compositions, for example, quantities on the order of about 0.05 weight percent or less, those components may be present in the form of trace impurities present in the raw materials, rather than intentionally added.

Additionally, components may be added to the batch composition, for example, to facilitate processing, that are later eliminated, thereby forming a glass composition that is essentially free of such components. Thus, for instance, minute quantities of components such as fluorine and sulfate may be present as trace impurities in the raw materials providing the silica, calcia, alumina, titania, lithia and zinc oxide components in commercial practice of the invention or they may be processing aids that are essentially removed during manufacture.

As is apparent from the above examples, glass fiber compositions of the invention have advantageous properties, such as lower fiberizing temperatures and wide differences between the liquidus temperatures and the fiberizing temperatures (high ΔT values).

The present invention should not be considered limited to the specific examples described herein, but rather should be understood to cover all aspects of the invention. Various modifications, equivalent processes, as well as numerous structures and devices to which the present invention may be applicable will be readily apparent to those of skill in the art. Those skilled in the art will understand that various changes may be made without departing from the scope of the invention, which is not to be considered limited to what is described in the specification.

What is claimed is:

1. A reinforcing glass fiber consisting of:
   48-54 weight percent $SiO_2$;

7-14 weight percent $Al_2O_3$;
10-16 weight percent CaO;
7-13 weight percent $TiO_2$;
11-19 weight percent ZnO;
0-2 weight percent $LiO_2$; and
less than 2 weight percent of compounds selected from the group consisting of: $P_7O_5$, $ZrO_2$, SrO, BaO, $SO_3$, $F_2$, $B_2O_3$ and $Fe_2O_3$,
wherein the reinforcing glass fiber has a refractive index between 1.60 and 1.66 at 590 nm.

2. The reinforcing glass fiber of claim 1, wherein the reinforcing glass fiber has a refractive index between 1.62 and 1.66 at 486 nm.

3. The reinforcing glass fiber of claim 1, comprising between and 51.75 weight percent $SiO_2$.

4. The reinforcing glass fiber of claim 1, wherein the reinforcing glass fiber has a refractive index between 1.61 and 1.64 at 656 nm.

5. The reinforcing glass fiber of claim 1, wherein the reinforcing glass fiber has an Abbe number between 42.6 and 47.6.

6. The reinforcing glass fiber of claim 1 consisting of:
   48-51.75 weight percent $SiO_2$;
   10-13 weight percent $Al_2O_3$;
   13.75-16 weight percent CaO;
   7-11 weight percent $TiO_2$;
   less than 2 weight percent of compounds selected from the group consisting of $P_2O_5$, $ZrO_2$, SrO, BaO, $SO_3$, $F_2$, $B_2O_3$, and $Fe_2O_3$; and
   11-13 weight percent ZnO,
   wherein the reinforcing glass fiber has a refractive index between 1.62 and 1.65 at 656 nm.

7. The reinforcing glass fiber of claim 1, wherein the reinforcing glass fiber has a Young's modulus greater than 12.8 MPsi.

8. A composite material, comprising:
   a polymer matrix having a refractive index of between 1.60 and 1.66 at 590 nm; and
   a plurality of glass reinforcing fibers having a refractive index between 1.60 and 1.66 at 590 nm, the glass reinforcing fibers consisting of:
   48-54 weight percent $SiO_2$;
   7-14 weight percent $Al_2O_3$;
   10-16 weight percent CaO;
   7-13 weight percent $TiO_2$;
   11-19 weight percent ZnO;
   0-2 weight percent $LiO_2$; and
   less than 2 weight percent total of compounds selected from the group consisting of: $P_2O_5$, $ZrO_2$, SrO, BaO, $SO_3$, $F_2$, $B_2O_3$, and $Fe_2O_3$.

9. The composite material of claim 8, wherein the glass reinforcing fibers consist of:
   48-51.75 weight percent $SiO_2$;
   10-13 weight percent $Al_2O_3$;
   13.75-16 weight percent CaO;
   7-11 weight percent $TiO_2$;
   11-13 weight percent ZnO; and
   0-2 weight percent $LiO_2$.

10. The composite material of claim 8, wherein the glass reinforcing fibers have an Abbe number between 42.6 and 47.6.

11. The composite material of claim 8, wherein the polymer matrix comprises one or more of polysulfone, polyether sulfone, and polyether imide.

12. The composite material of claim 11, wherein the polymer matrix comprises polysulfone.

13. A composite material, comprising:
   a polymer matrix; and
   a plurality of glass reinforcing fibers consisting of:
   48-51.75 weight percent $SiO_2$;
   10-13 weight percent $Al_2O_3$;
   10.75-16 weight percent CaO;
   7-11 weight percent $TiO_2$;
   11-13 weight percent ZnO;
   less than 2 weight percent total of compounds selected from the group consisting of $P_2O_5$, $ZrO_2$, SrO, BaO, $SO_3$, $F_2$, $B_2O_3$, and $Fe_2O_3$; and
   0-2 weight percent $LiO_2$.

14. The composite material of claim 13, wherein the glass reinforcing fibers have a refractive index between 1.60 and 1.66 at 590 nm.

15. The composite material of claim 11, wherein the polymer matrix comprises one or more of polysulfone, polyether sulfone, and polyether imide.

* * * * *